United States Patent
Robinson

(10) Patent No.: US 7,869,528 B2
(45) Date of Patent: Jan. 11, 2011

(54) MULTI-CARRIER TRANSCEIVER ASSEMBLY

(75) Inventor: Ian Robinson, Venice, CA (US)

(73) Assignee: Northrop Grumman Systems Corporation, Los Angeles, CA (US)

(*) Notice: Subject to any disclaimer, the term of this patent is extended or adjusted under 35 U.S.C. 154(b) by 2202 days.

(21) Appl. No.: 10/700,310

(22) Filed: Oct. 31, 2003

(65) Prior Publication Data

US 2005/0094714 A1  May 5, 2005

(51) Int. Cl.
 *H04K 27/28* (2006.01)
(52) U.S. Cl. .................. 375/260; 375/148; 375/146; 375/147; 375/316; 375/295
(58) Field of Classification Search ............. 375/148, 375/260, 146, 147, 316, 295, 219
 See application file for complete search history.

(56) References Cited

U.S. PATENT DOCUMENTS

| | | | |
|---|---|---|---|
| 5,249,201 A | 9/1993 | Posner et al. | |
| 5,408,690 A * | 4/1995 | Ishikawa et al. | 455/115.4 |
| 5,585,850 A * | 12/1996 | Schwaller | 375/240.01 |
| 5,680,388 A | 10/1997 | Kahre | |
| 5,805,983 A * | 9/1998 | Naidu et al. | 455/67.16 |
| 5,809,395 A * | 9/1998 | Hamilton-Piercy et al. | 725/106 |
| 5,838,675 A | 11/1998 | Rauscher | |
| 5,914,933 A | 6/1999 | Cimini et al. | |
| 5,933,062 A * | 8/1999 | Kommrusch | 333/193 |
| 5,974,101 A * | 10/1999 | Nago | 375/350 |
| 6,081,515 A * | 6/2000 | Toivola | 370/339 |
| 6,115,368 A * | 9/2000 | Schilling | 370/335 |
| 6,128,470 A * | 10/2000 | Naidu et al. | 455/16 |
| 6,131,016 A | 10/2000 | Greenstein et al. | |
| 6,291,924 B1 * | 9/2001 | Lau et al. | 310/313 R |
| 6,292,981 B1 * | 9/2001 | Ford et al. | 16/357 |
| 6,331,837 B1 | 12/2001 | Shattil | |
| 6,404,783 B1 | 6/2002 | Cimini, Jr. et al. | |
| 6,442,214 B1 | 8/2002 | Boleskei et al. | |
| 6,473,416 B1 * | 10/2002 | Lee | 370/342 |
| 6,587,081 B2 * | 7/2003 | Noro et al. | 343/895 |
| 6,611,565 B1 * | 8/2003 | Bada et al. | 375/295 |

(Continued)

FOREIGN PATENT DOCUMENTS

EP  0 831 627 A2  3/1998

(Continued)

OTHER PUBLICATIONS

Huang, et al., "Technique for Alleviating Dyanmica-Range Requirements for Wideband Software Radio Receiver", Institute for Communications Research (ICR), p. 1-6.

(Continued)

*Primary Examiner*—Chieh M Fan
*Assistant Examiner*—Siu M Lee
(74) *Attorney, Agent, or Firm*—Tarolli, Sundheim, Covell & Tummino LLP

(57) ABSTRACT

An assembly and method for processing of multi-carrier signals is provided. A plurality of carrier signals are combined into a combined multi-carrier signal represented in a first domain. The combined multi-carrier signal is converted from the first domain to a second domain. The converted multi-carrier signal is distributed into a plurality of signals represented in the second domain.

14 Claims, 12 Drawing Sheets

U.S. PATENT DOCUMENTS

| | | | |
|---|---|---|---|
| 6,664,921 B2* | 12/2003 | Pratt | 342/357.06 |
| 6,914,437 B2* | 7/2005 | Ibrahim et al. | 324/616 |
| 6,944,139 B1* | 9/2005 | Campanella | 370/315 |
| 6,985,434 B2* | 1/2006 | Wu et al. | 370/208 |
| 7,013,166 B2* | 3/2006 | Clifford | 455/562.1 |
| 7,099,316 B1* | 8/2006 | Tomich et al. | 370/389 |
| 7,110,434 B2* | 9/2006 | Currivan et al. | 375/144 |
| 7,146,144 B2* | 12/2006 | Robinson et al. | 455/260 |
| 7,162,218 B2* | 1/2007 | Axness et al. | 455/324 |
| 7,184,490 B1* | 2/2007 | Rybicki et al. | 375/297 |
| 7,289,784 B2* | 10/2007 | Nam | 455/339 |
| 2001/0012788 A1* | 8/2001 | Gammon | 455/562 |
| 2001/0050987 A1* | 12/2001 | Yeap et al. | 379/399.01 |
| 2002/0047494 A1* | 4/2002 | Zhu et al. | 310/313 B |
| 2002/0051433 A1* | 5/2002 | Affes et al. | 370/335 |
| 2002/0080887 A1* | 6/2002 | Jeong et al. | 375/295 |
| 2002/0101935 A1 | 8/2002 | Wright et al. | |
| 2002/0101936 A1 | 8/2002 | Wright et al. | |
| 2002/0122008 A1* | 9/2002 | Caimi et al. | 343/742 |
| 2002/0159426 A1* | 10/2002 | Kanemoto et al. | 370/342 |
| 2002/0172231 A1 | 11/2002 | Claxton et al. | |
| 2002/0176510 A1 | 11/2002 | Laroia | |
| 2002/0196876 A1* | 12/2002 | Takada | 375/346 |
| 2003/0016771 A1* | 1/2003 | Nuutinen et al. | 375/346 |
| 2003/0027541 A1* | 2/2003 | Hotto | 455/280 |
| 2003/0171674 A1* | 9/2003 | Jago et al. | 600/437 |
| 2004/0041945 A1* | 3/2004 | Pugel et al. | 348/470 |
| 2004/0227683 A1* | 11/2004 | Caimi et al. | 343/742 |
| 2004/0228283 A1* | 11/2004 | Naguib et al. | 370/252 |
| 2005/0201481 A1* | 9/2005 | Calderbank et al. | 375/265 |
| 2005/0218984 A1* | 10/2005 | Yin | 330/257 |
| 2006/0072520 A1* | 4/2006 | Chitrapu et al. | 370/337 |

FOREIGN PATENT DOCUMENTS

EP     0 929 161 A2     7/1999

OTHER PUBLICATIONS

International Search Report for corresponding PCT/US2004/035983, completed Feb. 3, 2005 by A. Mier of the European Patent Office.

Leonard J. Cimini, Jr., and Nelson R. Sollenberger; *"OFDM with Diversity and Coding for High-Bit-Rate Mobile Data Applications"*; XP-000856378; AT&T Labs-Research; pp. 247-254.

\* cited by examiner

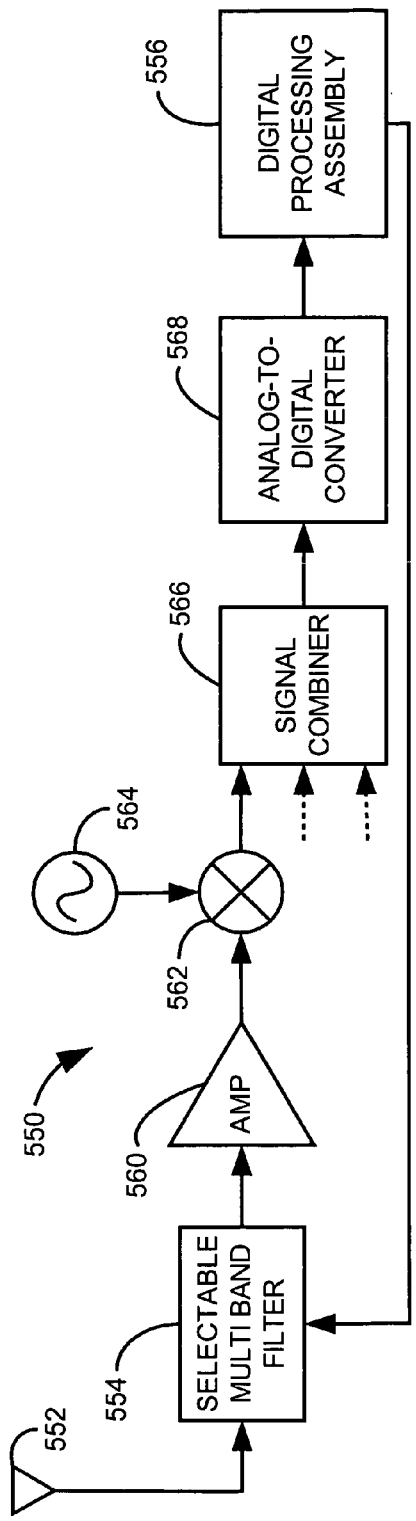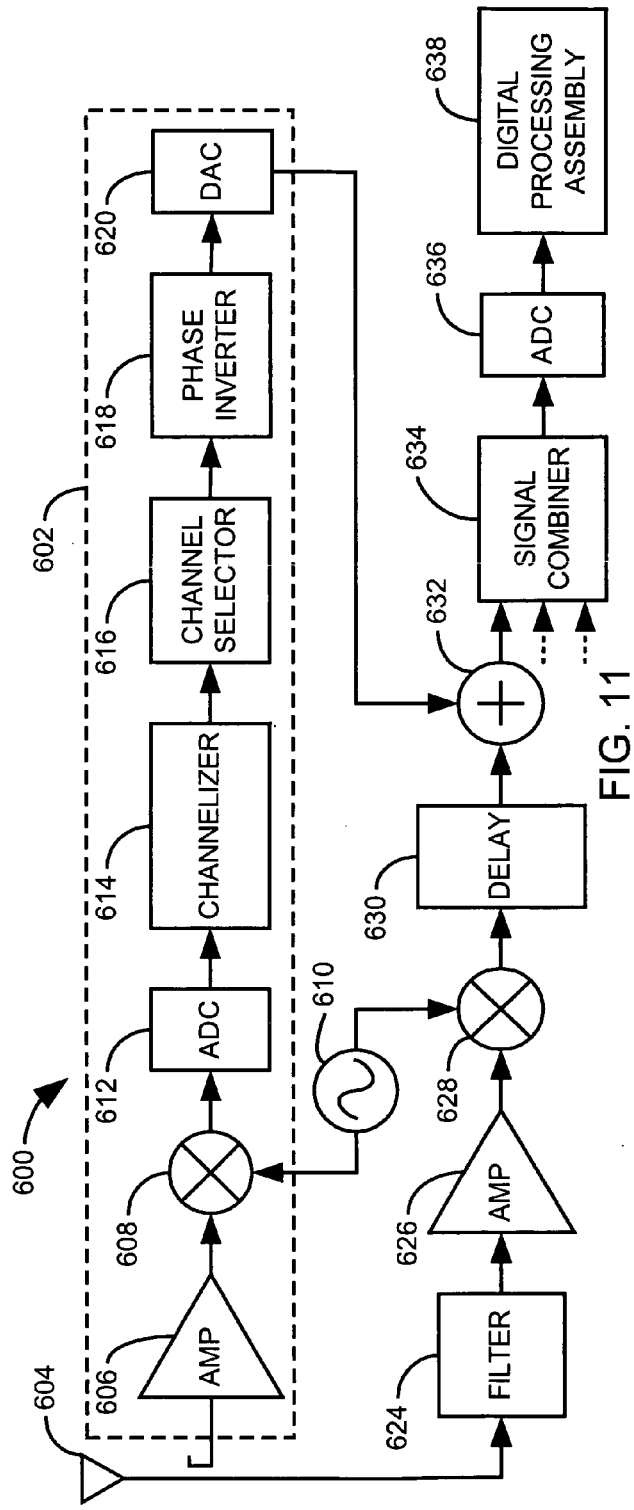

MULTI-CARRIER TRANSCEIVER ASSEMBLY

TECHNICAL FIELD

The present invention relates generally to communications systems, and more specifically to multiple carrier transceivers.

BACKGROUND OF THE INVENTION

Efforts in the design of integrated circuits for radio frequency (RF) communication systems generally focus on improving performance, reducing cost or a combination thereof. One area of increasing interest relates to conversion of signals, such as from analog-to-digital or digital-to-analog. As communications systems become increasingly complex, increased resolution is required in the signal conversion process. The expense of signal conversion components increases dramatically with the required resolution of the converter.

The present transmission model for GSM (Global Standard for Mobile Communications) and WCDMA (Wideband Code Division Multiple Access) requires multiple carriers to be fed to a number of antennas within associated with a given base station. Generally, each antenna will have one or more associated transceivers that provide signals for broadcast or process received signals. For example, one or more digital exciters can generate digital carrier signals, convert them to an analog format, and provide them to an associated antenna for broadcast.

A typical GSM base station can have a service area divided into three sectors, each transmitting a number of carriers. For example, a high capacity sector might transmit eight full duplex carriers. Each sector can include two or more antennas, some of which can only receive signals. Each antenna includes at least one transceiver unit. Generally, the peak demand for the entire base station will employ a subset of the carriers. A base station with eight carriers per sector may use only sixteen of the twenty-four carriers at peak demand, but the demand is spread across the sectors unevenly, in a time dependent manner. Even at peak demand, nearly one-third of the digital processing capacity of the base station remains idle. If each carrier is supplied by its own transmitter and receiver, then a significant amount of hardware, including the expensive power amplifiers are idle at any time.

It has been determined that a large portion of the expense associated with a multi-carrier base station receiver within a GSM or WCDMA system is represented by the signal conversion components (e.g., analog-to-digital converters and digital-to-analog converters) and the associated digital processing components. Thus, the idle components within the base station represent a significant and unnecessary expense. Unfortunately, each sector will likely experience traffic peaks at various times throughout a period of usage, such that a certain proportion of the components will remain idle.

SUMMARY OF THE INVENTION

In accordance with one aspect of the present invention, a multi-carrier transmitter assembly is provided. A digital exciter provides a digital multi-carrier signal from baseband data. A digital-to-analog converter converts the digital multi-carrier signal into an analog multi-carrier signal. A signal distributor distributes the analog multi-carrier signal into a plurality of analog carrier signals. A plurality of antennas each transmit at least one of the plurality of analog carrier signals.

In accordance with another aspect of the present invention, a multi-carrier receiver assembly is provided. A plurality of antennas each receive one or more analog carrier signals. A signal combiner combines the analog carrier signals from the plurality of antennas into an analog multi-carrier signal. An analog-to-digital converter converts the analog multi-carrier signal into a digital multi-carrier signal. A digital processing assembly processes the digital multi-carrier signal to extract information from the multi-carrier signal.

In accordance with yet another aspect of the present invention, a method of transmitting a multi-carrier signal is provided. A digital multi-carrier signal is generated at an exciter. The digital multi-carrier signal is converted into an analog multi-carrier signal. The analog multi-carrier signal is distributed into a plurality of analog signals. The plurality of analog signals are provided to respective antennas for transmission.

In accordance with still another aspect of the present invention, a method is provided for processing a plurality of carrier signals. A plurality of analog carrier signals are received at a plurality of antennas. The plurality of analog signals are combined into a multi-carrier analog signal. The analog multi-carrier signal is converted into a digital multi-carrier signal. The digital multi-carrier signal is processed at a digital processing assembly.

In accordance with a further aspect of the present invention, a system for processing of multi-carrier signals is provided. A plurality of carrier signals are combined into a combined multi-carrier signal represented in a first domain. The combined multi-carrier signal is converted from the first domain to a second domain. The converted multi-carrier signal is distributed into a plurality of signals represented in the second domain.

BRIEF DESCRIPTION OF THE DRAWINGS

FIG. 10 illustrates an exemplary antenna path assembly that dynamically selects one or more desired frequencies as part of a multi-carrier application.

FIG. 11 illustrates an exemplary antenna path assembly that provides a feedforward signal for attenuating an interfering signal as part of a multi-carrier application.

DETAILED DESCRIPTION OF INVENTION

The present invention related to systems and methods for processing multi-carrier signals in a transceiver assembly. In accordance with an aspect of the invention, a plurality of signals, each having an associated transmission or reception antenna, can be processed at a single assembly of digital circuitry. For example, a digital exciter can produce a multi-carrier signal. The multi-carrier signal can be converted to an analog signal, distributed into a plurality of analog carrier signals, and provided to a plurality of antennas. Similarly, analog carrier signals received at a plurality of antennas can be combined into a multi-carrier signal, converted into a digital signal, and provided to a digital processing assembly with a receiver for processing. Application of an aspect of the present invention can allow base station hardware in a communications system to be consolidated, leading to a significant increase in processing efficiency and a reduction of the overall cost of each base station. One or more other aspects of the present invention can facilitate the introduction of a distributed transceiver system, in which digital circuitry is consolidated in a central base station, while the analog transmission and reception of signals is distributed across a plurality of peripheral stations.

Figure 1:
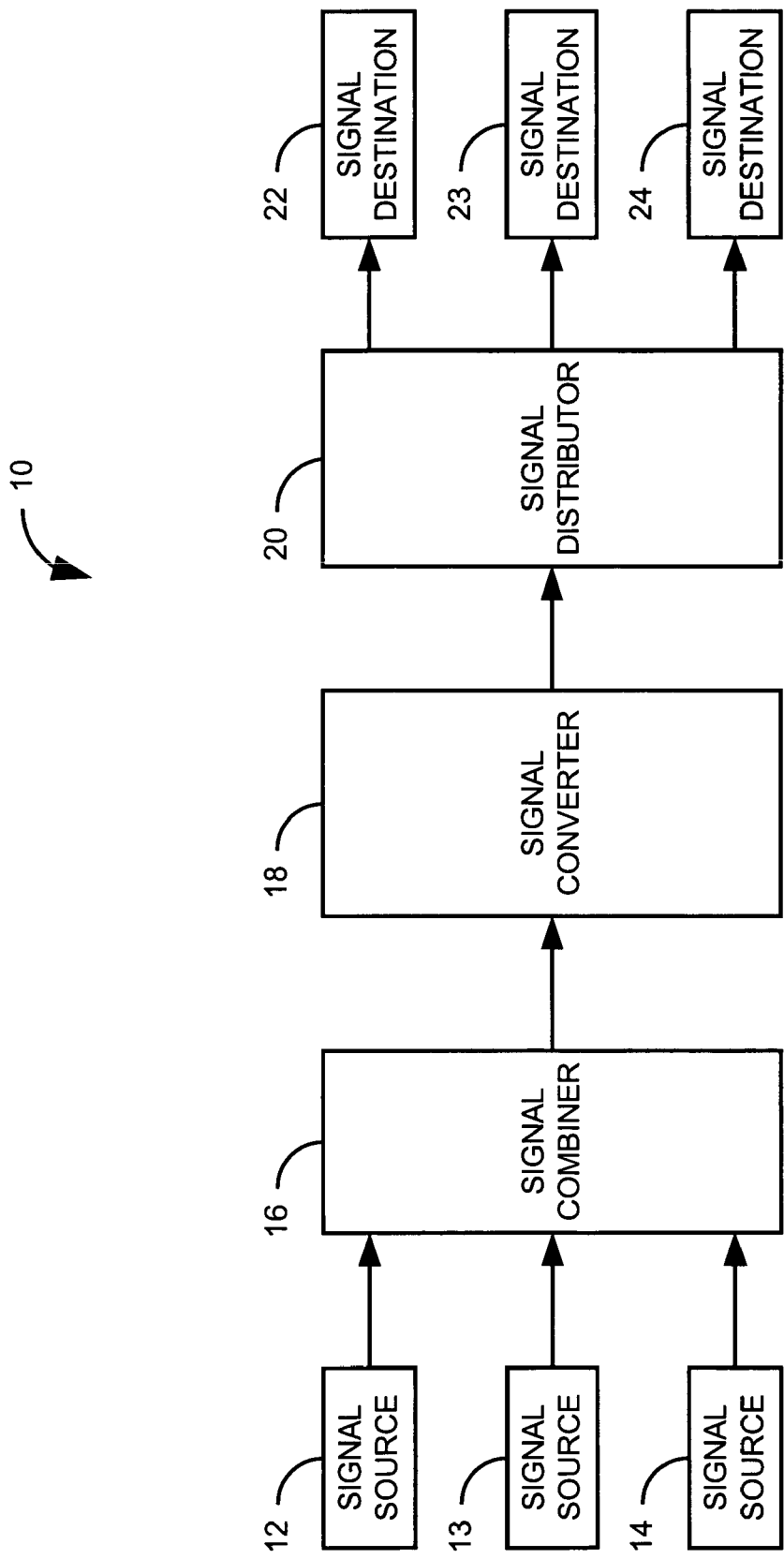
FIG. 1 illustrates a method for processing multi-carrier signals in accordance with an aspect of the present invention.

FIG. 1 illustrates a transceiver system 10 for processing multi-carrier signals in accordance with an aspect of the present invention. One or more signal sources 12, 13, and 14 provide a plurality of carrier signals of interest to the transceiver system 10. For example, the signals can be digital carrier signals produced at an exciter or analog signals received at a plurality of antennas. It will be appreciated that while FIG. 1 illustrates three signal sources, the one or more signal sources can be a single source producing multiple signals (e.g., a multi-carrier digital exciter) or plural sources producing one or more signals.

The signals of interest are provided to a signal combiner 16. The signal combiner 16 combines the signals of interest into a multi-carrier signal. The signal combiner 16 can be implemented with appropriate circuitry that is operative to combine multiple signals. For example, the signal combiner 16 can comprise several multiplexer arrangements, a serializer, or another appropriate means for combining the signal of interest.

The multi-carrier signal is provided to a signal converter 18. The signal converter 18 converts the signal from a first domain to a second domain. For example, the signal converter 18 can comprise an analog-to-digital converter that converts an analog multi-carrier signal into a digital multi-carrier signal. Conversely, the signal converter 18 can comprise a digital-to-analog converter that converts a digital multi-carrier signal into an analog multi-carrier signal. It will be appreciated that the signal conversion can be performed by a variety of appropriate means for signal conversion.

The converted signal is provided to a signal distributor 20. The signal distributor 20 distributes the multi-carrier signal into a plurality of signals, each having the same or fewer associated carriers than the multi-carrier signal. In an exemplary embodiment, each of the plurality of signals comprises a signal carrier, although it will be appreciated that the signals can themselves be multi-carrier signals. The signal distributor 20 can be implemented in as a variety of appropriate means for separating a multi-carrier signal. For example, the signal distributor 20 can comprise a demultiplexer, operative to separate signals multiplexed via an associated multiplexing scheme. Alternatively, the signal distributor 20 can comprise one or more filters that attenuate unwanted carriers from respective copies of the signal to isolate one or more desired carriers. The signal distributor 20 can also comprise one or more decoders that provide a despreading signal to respective copies of the signal to uniquely recover one or more desired carriers.

The plurality of signals are provided to one or more signal destinations 22, 23, and 24. It will be appreciated that while FIG. 1 illustrates three signal destinations 22, 23, and 24, the one or more signal destinations can be a single destination receiving multiple signals (e.g., a processing assembly within a receiver) or plural sources receiving one or more signals. For example, the one or more signal destinations 22, 23, and 24 can be a digital processing assembly within a receiver that extracts data from the received signals. Alternatively, the one or more signal destinations 22, 23, and 24 can represent a plurality of antennas that transmit respective carrier signals.

Figure 2:
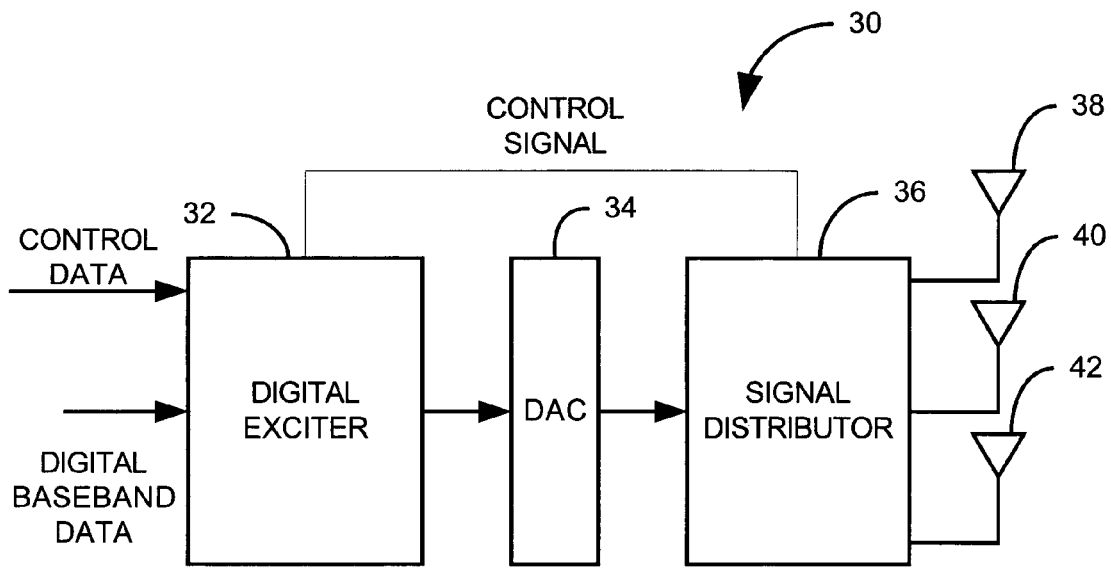
FIG. 2 illustrates a functional block diagram of a multi-carrier transmitter assembly in accordance with an aspect of the present invention.

FIG. 2 illustrates a functional block diagram of a multi-carrier transmitter assembly 30 in accordance with an aspect of the present invention. A plurality of baseband digital signals are received at a digital exciter 32. The digital exciter 32 produces a multi-carrier signal from the received baseband data. For the purpose of the present invention, a radio frequency signal can be a signal having a frequency within the megahertz or the gigahertz range. The digital exciter 32 can also comprise digital filters, mixers, amplifiers, delta-sigma modulators, multiplexers, and other desired components for processing the digital baseband data.

The signal is then provided to a digital-to-analog converter (DAC) 34. The DAC 34 converts the digital multi-carrier signal to an analog representation of the signal. The signal is then passed to a signal distributor 36. The signal distributor 36 divides the analog multi-carrier signal into a plurality of analog signals, each comprising fewer carriers than the original multi-carrier signal. In an exemplary implementation, each of the plurality of analog signals is a single carrier signal, but it will be appreciated that the signals can contain multiple carriers. Additionally, while three signal paths are illustrated as the output of the signal distributor 36 in FIG. 2, the output of the signal distributor 36 can also comprise two, or four or more analog signals in accordance with the present invention.

The signal distributor 36 can be implemented in a number of ways. For example, the signal distributor 36 can comprise a demultiplexer, operative to separate signals multiplexed via an associated multiplexing scheme. Alternatively, the signal distributor 36 can comprise one or more filters that attenuate unwanted carriers from a copy of the signal to isolate one or more desired carriers. It will be appreciated that all or a portion of the signal distributor 36 can be spatially (e.g., geographically) separated from the digital exciter 32 and the DAC 34. For example, the exciter 32 and DAC 34 can be located at a central base station while the signal distributor 36 is distributed between the central base station and one or more peripheral base stations.

The plurality of analog signals output from the signal distributor 36 are provided to a plurality of antennas 38, 40, and 42. While three antennas are illustrated in FIG. 2, the transmitter assembly 30 can also comprise either two, four, or more than four antennas in accordance with the present invention. Each antenna (e.g., 38) receives one or more of the plurality of analog carrier signals. The antennas 38, 40, and 42 broadcast their one or more received carriers as a radio frequency broadcast. It will be appreciated that the plurality of antennas 38, 40, and 42, can be spatially separated from the digital exciter 32 and the DAC 34. For example, the digital exciter 32 and the DAC 34 can be located at a central base station, while the plurality of antennas 38, 40, and 42 can be distributed across one or more peripheral base stations.

Figure 3:
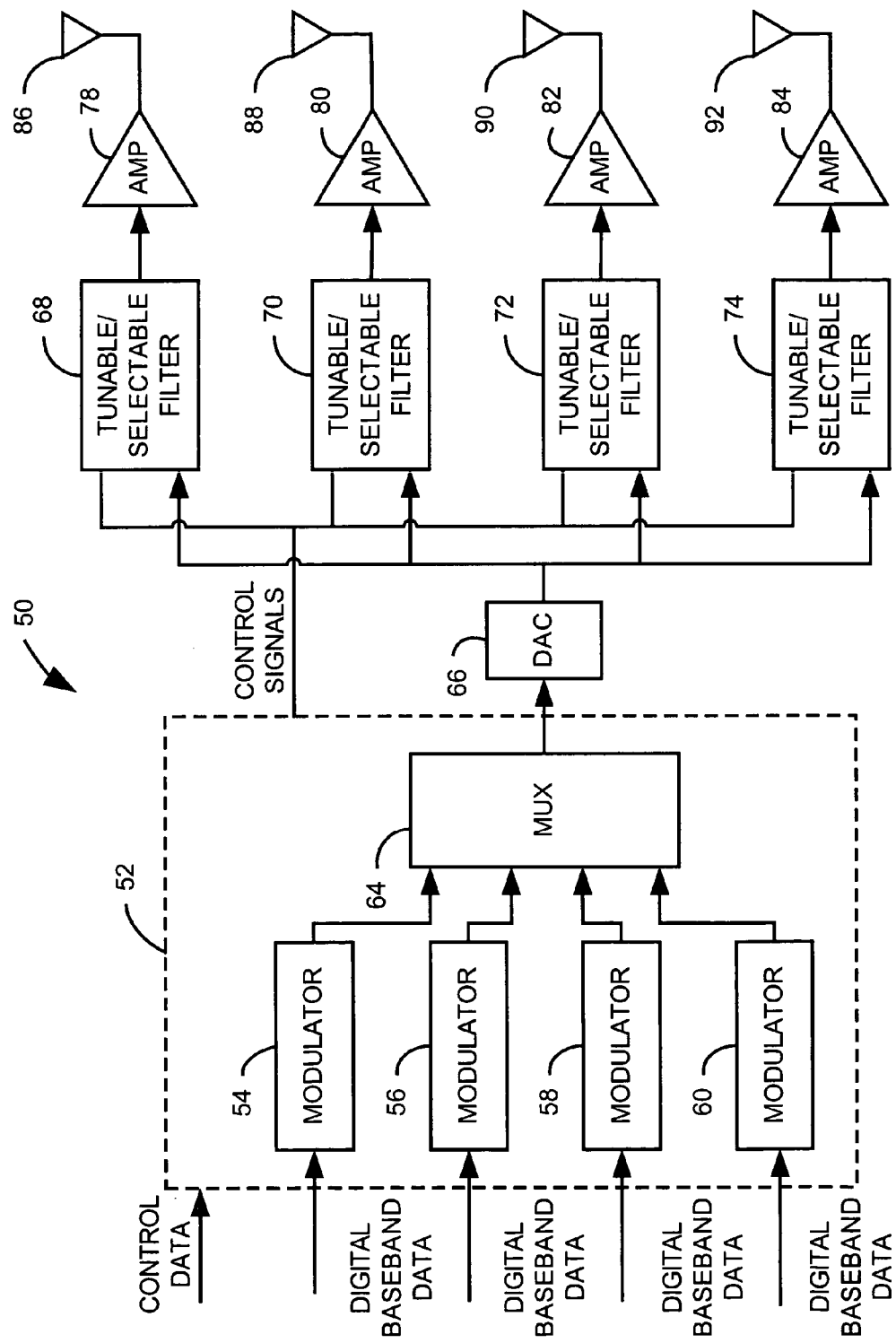
FIG. 3 illustrates a functional block diagram of a first exemplary multi-carrier transmitter assembly in accordance with an aspect of the present invention.

FIG. 3 illustrates a functional block diagram of an exemplary transmitter assembly 50 in accordance with an aspect of the present invention. A digital exciter 52 receives baseband signal data relating to a plurality of baseband signals. Baseband signal data is received at each of a plurality of modulators 54, 56, 58, and 60. Each modulator (e.g., 54) modulates the baseband data as to provide a carrier signal. This can be accomplished by digitally modulating the baseband, by oversampling combined with delta-sigma modulation of the baseband data, or by another desired method. The resultant carrier frequencies can be radio frequency signals or have a frequency intermediate between the baseband frequency and traditional radio frequencies. In the illustrated implementation, each of the modulators (e.g., 54) produces a carrier signal having a different associated frequency. The signals can be combined at a low frequency and converted to final RF frequency using a delta-sigma DAC.

The carrier signals are provided to a multiplexer 64 where they are combined into a digital multi-carrier signal. In the illustrated example, the signals are multiplexed by frequency. It will be appreciated that the multiplexer 64 can comprise a summer that sums the carrier signals. The digital multi-carrier signal is then provided to a digital-to-analog converter (DAC) 66, where the digital signal is converted into an analog multi-carrier signal. The multi-carrier analog signal is provided to a plurality of antenna paths. Each antenna path comprises a tunable or selectable filter 68, 70, 72, and 74, an amplifier 78, 80, 82, and 84, and an antenna, 86, 88, 90, and 92. It will be appreciated other circuitry can be present on the antenna path. For example, the antenna path can include upconverters, amplifiers, additional filters, and other desired analog circuitry.

The multi-carrier signal is received at the tunable or selectable filter (e.g., 68) on each path. The tunable or selectable filter (e.g., 68) can comprise one or more of a variety of filters capable of electrical adjustment of the center frequency of its passband or stopband by either selecting a center frequency from a plurality of discrete frequencies or tuning the filter to a desired frequency along a continuous range. In an exemplary embodiment, one or more of the filters are surface acoustic wave (SAW) filters capable of frequency adjustment through electrically actuatable micromechanical structures. Each filter (e.g., 68) can be electrically adjusted via a control signal from the exciter 52 to attenuate undesired carrier frequencies in the multi-carrier signal, while passing one or more desired carrier signals for the antenna path.

The desired carrier signals in each path are passed to a power amplifier (e.g., 78) where they are amplified to an appropriate level for transmission. The amplified signals are then provided to their respective antennas (e.g., 86) for transmission. It will be appreciated that the illustrated transmission paths are simplified for the purposes of illustration. For example, the desired carrier signals can be further upconverted and filtered prior to amplification and transmission. Additionally, while four antenna paths are illustrated in FIG. 3, either two, three, or more than four antennas can also be utilized in accordance with an aspect of the present invention.

Figure 4:
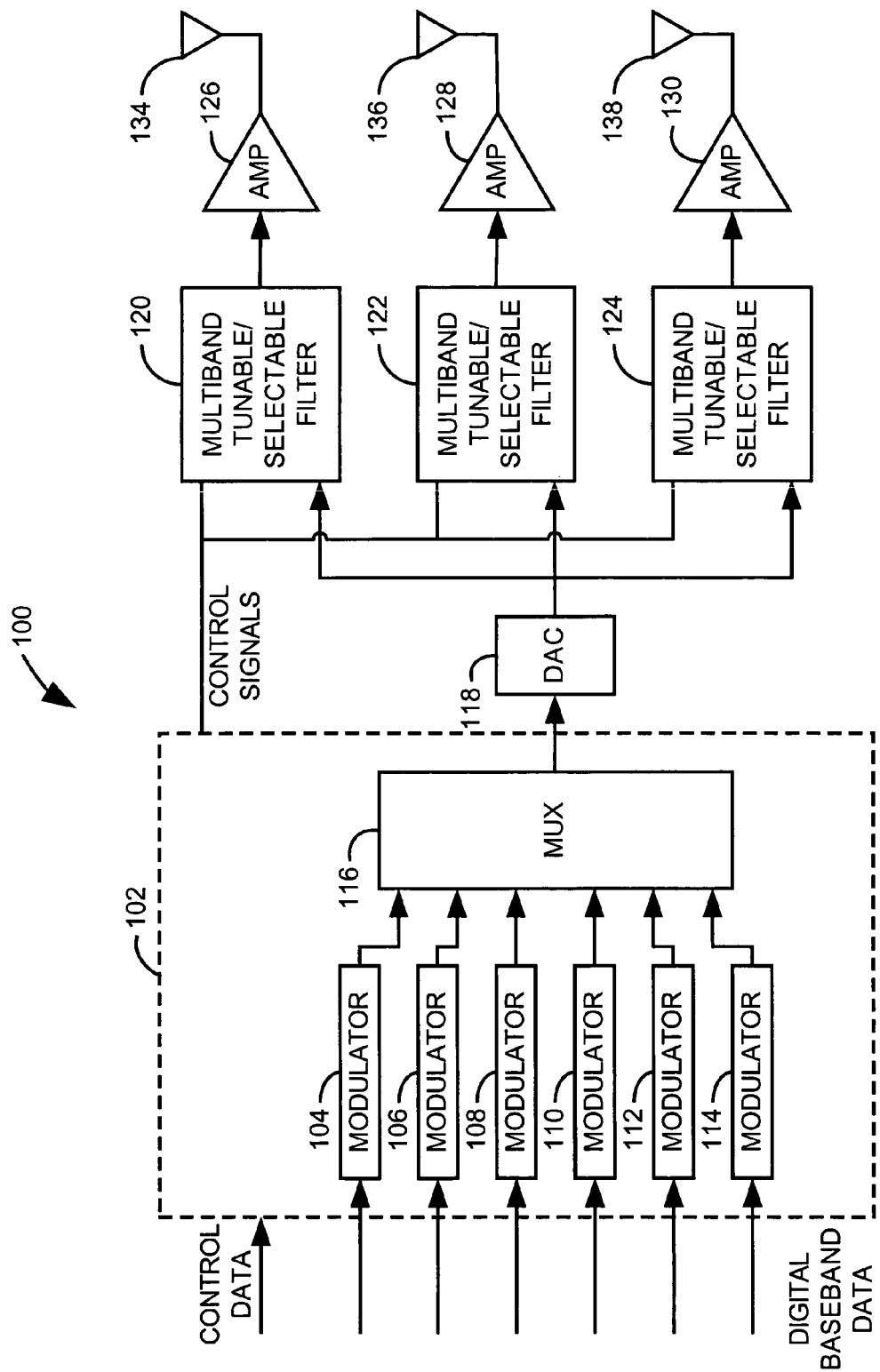
FIG. 4 illustrates a functional block diagram of a second exemplary multi-carrier transmitter assembly in accordance with an aspect of the present invention.

FIG. 4 illustrates an exemplary transmitter assembly 100 in accordance with an aspect of the present invention. A digital exciter 102 receives baseband signal data relating to a plurality of baseband signals. Baseband signal data is received at each of a plurality of modulators 104, 106, 108, 110, 112, and 114. Each modulator (e.g., 104) modulates the baseband data as to provide a carrier signal. The carrier frequencies can be radio frequency signals or have a frequency intermediate between the baseband frequency and traditional radio frequencies. In the illustrated implementation, each of the modulators (e.g., 104) produces a carrier signal having a different associated frequency. In an exemplary embodiment, the signals can be combined at a low frequency and converted to final RF frequency using a delta-sigma DAC.

The carrier signals are provided to a multiplexer 116 where they are combined into a digital multi-carrier signal. In the illustrated example, the signals are multiplexed by frequency. The digital multi-carrier signal is then provided to a digital-to-analog converter (DAC) 118, where the digital signal is converted into an analog multi-carrier signal. The multi-carrier analog signal is provided to a plurality of antenna paths. Each antenna path comprises a multi-band tunable or selectable filter 120, 122, and 124, an amplifier 126, 128, and 130, and an antenna 134, 136, and 138. It will be appreciated other circuitry can be present on the antenna path. For example, the antenna path can include upconverters, additional filters, and other desired analog circuitry.

The multi-carrier signal is received at the tunable or selectable filter (e.g., 120) on each path. The multiband tunable or selectable filter can have multiple passbands and stopbands, each having an associated center frequency. The filter can be adjusted electrically to select a center frequency for each passband and stopband either from a plurality of discrete frequencies or from a continuous range of frequency values. In an exemplary embodiment, one or more of the filters are surface acoustic wave (SAW) filters capable of frequency adjustment through electrically actuatable micromechanical structures. Each filter (e.g., 120) can be electrically adjusted via a control signal from the exciter 102 to attenuate undesired carrier frequencies in the multi-carrier signal, while passing a plurality of desired carrier signals for the antenna path.

The desired carrier signals in each path are passed to a power amplifier (e.g., 126) where they are amplified to an appropriate level for transmission. The amplified signals are then provided to their respective antennas (e.g., 134) for transmission. It will be appreciated that the illustrated transmission paths are simplified for the purposes of illustration. For example, the desired carrier signals can be further upconverted and filtered prior to amplification and transmission. Additionally, while three antenna paths are illustrated in FIG. 4, either two, four, or more than four antennas can also be utilized in accordance with an aspect of the present invention.

Figure 5:
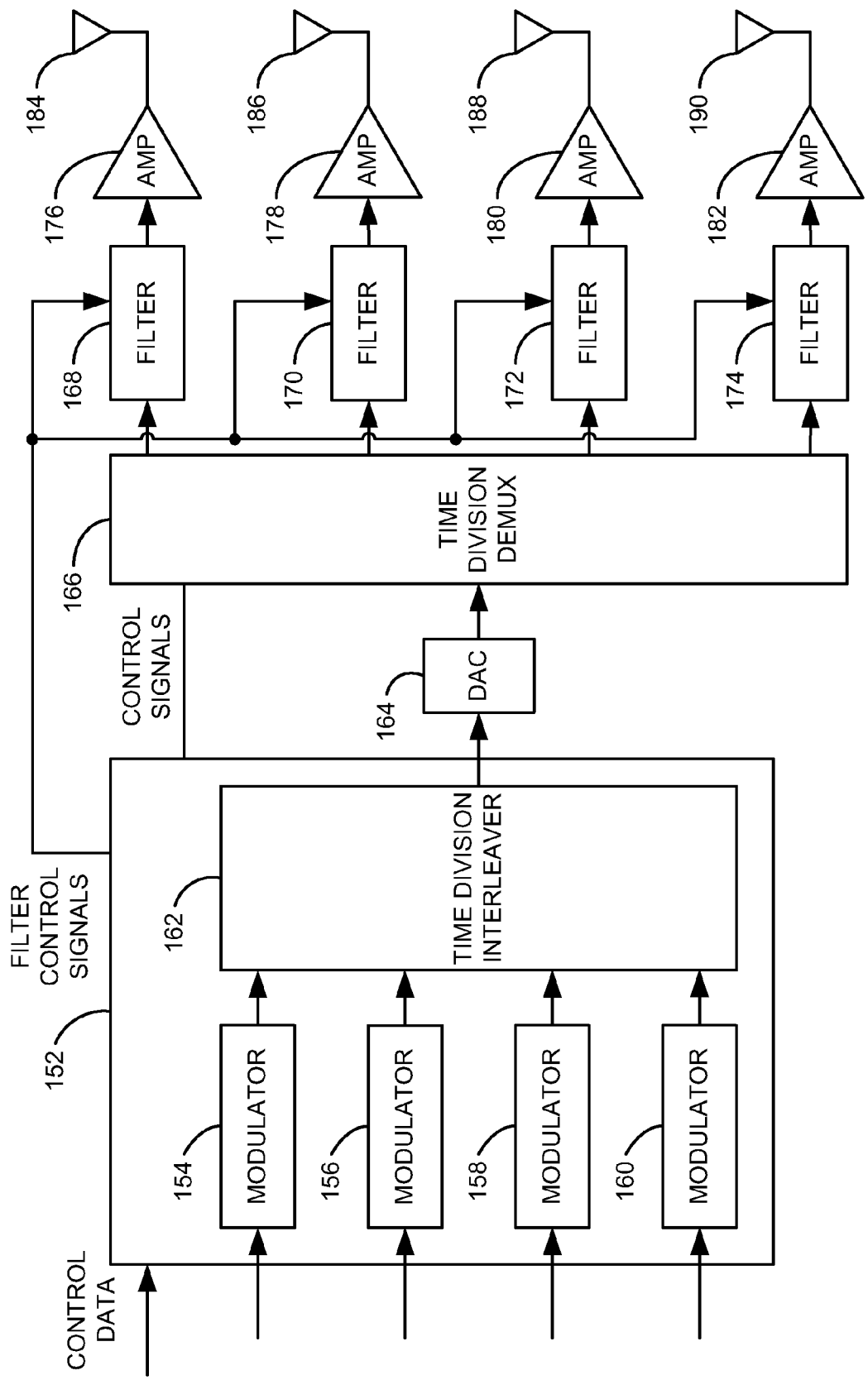
FIG. 5 illustrates a functional block diagram of a third exemplary multi-carrier transmitter assembly in accordance with an aspect of the present invention.

FIG. 5 illustrates an exemplary transmitter assembly 150 utilizing time interleaving to multiplex the signals. A plurality of digital baseband signals are received at an exciter 152. The baseband signals are provided to respective modulators 154, 156, 158, and 160 where they are modulated with a carrier signal with a degree of oversampling. For example, the signals can be modulated with carrier signals having respective intermediate frequencies. The modulated signals are then provided to a time division interleaver 162. The time division interleaver 162 sequentially interleaves the digital signals, replacing redundant samples from one signal with samples from another, to produce a combined signal. For example, the time division interleaver 162 can serialize sequentially drawn samples from the plurality of signals. It will be appreciated that the exciter 152 can comprise additional components other than those illustrated. For example, the exciter 152 can include additional upconversion components, such as mixers and oscillators, and various other components, such as filters, delta-sigma modulators, and amplifiers.

The combined signal is then passed to a digital-to-analog converter 164. The digital-to-analog converter 164 converts the combined signal into an analog representation of the combined signal. The analog combined signal is then passed to a time division demultiplexer 166. The time division demultiplexer 166 deserializes the combined signals to produce a plurality of analog signals. The time division demultiplexer 166 is controlled via a control signal from the exciter 152 to ensure synchronous operation of the interleaver 162 and the demultiplexer 166. The digital-to-analog converter (DAC) can be a delta-sigma DAC that converts the multicarrier signal to a final RF frequency.

The analog signals are provided to a plurality of antenna paths. Each antenna path comprises an amplifier 176, 178, 180, and 182 and an antenna 184, 186, 188, and 190. The analog paths can further comprise optional respective optional filters 192, 194, 196, and 198. It will be appreciated other circuitry can be present on the antenna path. For example, the antenna path can include upconversion components, additional filters, and other desired analog circuitry. It will further be appreciated that the antenna path components can be spatially removed from the exciter 152 and the digital-to-analog converter 164. For example, the exciter 152 and the DAC 164 can be located at a central base station, while the antenna paths can be distributed across one or more peripheral base stations.

On each antenna path, one or more of the plurality of analog signals are received at a filter (e.g., 168). The filter (e.g., 168) can have one or more passbands or stopbands, each having an associated center frequency. In an exemplary embodiment, one or more of the filters 168, 170, 172, and 174 are surface acoustic wave (SAW) filters. The filter (e.g., 168) attenuates noise within the one or more signals, and passes one or more desired signals to a power amplifier (e.g., 176). The power amplifier (e.g., 176) amplifies the one or more desired signals to an appropriate level for transmission. The amplified signals are then provided to an antenna (e.g., 184) for transmission. It will be appreciated that the illustrated transmission paths are simplified for the purposes of illustration. For example, the desired carrier signals can be further upconverted and filtered prior to amplification and transmission. Additionally, while four antenna paths are illustrated in FIG. 5, either two, three, or more than four antennas can also be utilized in accordance with an aspect of the present invention.

Figure 6:
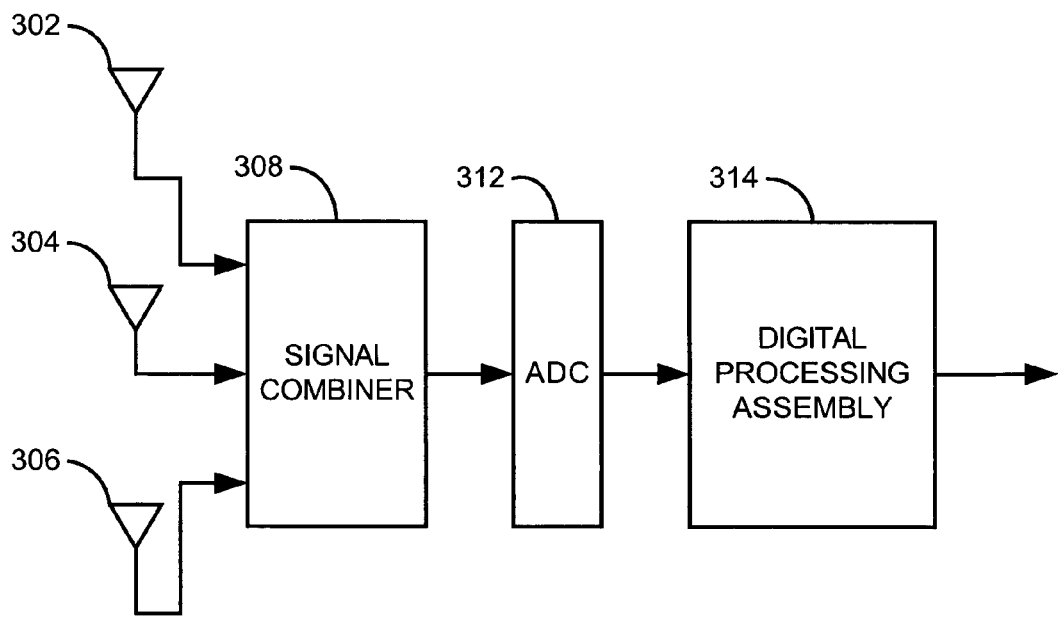
FIG. 6 illustrates a functional block diagram of a multi-carrier receiver assembly in accordance with an aspect of the present invention.

FIG. 6 illustrates a multi-carrier receiver assembly 300 in accordance with an aspect of the present invention. While three antennas are illustrated in FIG. 6, the receiver assembly 300 can comprise either two, four, or more than four antennas in accordance with the present invention. Analog carrier signals are received at a plurality of antennas 302, 304, and 306. The received signals can be single carrier or multi-carrier signals, depending on the application. In an exemplary implementation, the received signals are radio frequency signals, and are downconverted to lower frequencies once they are received.

The received signals are passed to a signal combiner 308. The signal combiner 308 combines the analog signals from the plurality of antennas to form a combined analog signal. The signal combiner 308 can be implemented by a variety of appropriate circuitry that is operative to combine multiple analog signals. In an exemplary implementation, the signal combiner is a multiplexer. It will be appreciated that the plurality of antennas 302, 304, and 306, can be spatially removed from the signal combiner 308. For example, the signal combiner 308 and components of the receiver assembly 300 upstream from the signal combiner can be located at a central base station, while the plurality of antennas 302, 304, and 306 can be distributed across one or more peripheral base stations.

The combined signal is provided to an analog-to-digital converter (ADC) 312. The analog-to-digital converter (ADC) 312 converts the analog signal into a digital signal. The digital signal is passed to a digital processing assembly 314. The digital processing assembly 314 then processes the digital signal to extract the information carried by the signal. The digital processing assembly 314 can include a variety of useful signal processing components, including components for downconverting, demodulating, and demultiplexing the digital signal.

Figure 7:
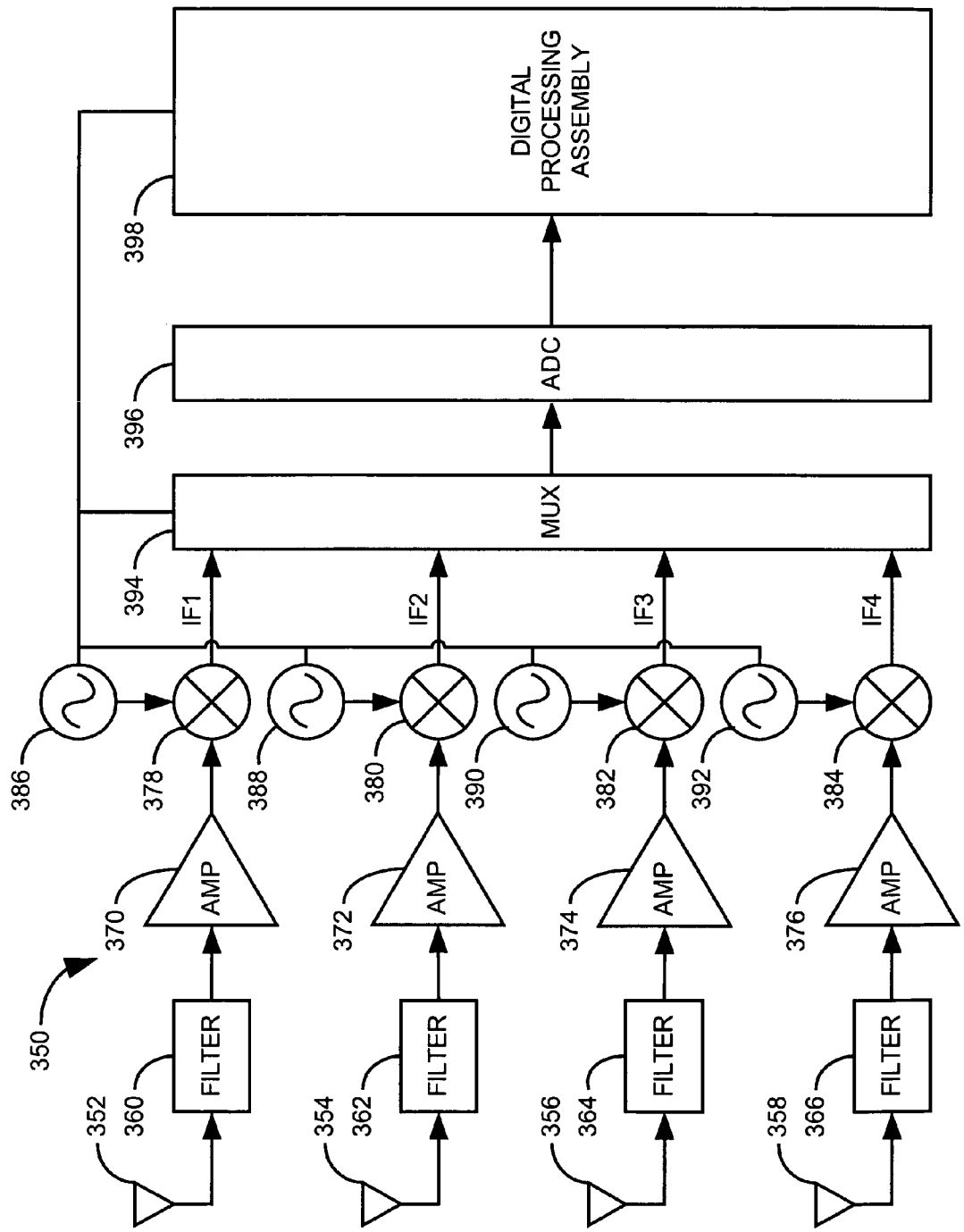
FIG. 7 illustrates a functional block diagram of an exemplary multi-carrier receiver assembly in accordance with an aspect of the present invention.

FIG. 7 illustrates an exemplary receiving apparatus 350 employing analog frequency multiplexing in accordance with an aspect of the present invention. Radio frequency analog signals are received at a plurality of antennas 352, 354, 356, and 358. While four antennas are illustrated in FIG. 7, the receiver assembly 350 can comprise either two, three, or more than four antennas in accordance with the present invention. The analog signals are filtered at respective filters 360, 362, 364, and 366. The filters can comprise appropriate analog circuitry for attenuating noise within a signal.

The filtered signals are passed to respective amplifiers 370, 372, 374, and 376 that amplify the signals to an appropriate level for processing. The amplified signals are then passed to respective mixers 378, 380, 382, and 384 for downconversion to an intermediate frequency. The mixers 378, 380, 382, and 384 have associated oscillators 386, 388, 390, and 392 that produce appropriate signals for downconverting the analog signals. Each oscillator (e.g., 386) produces a signal with a different intermediate frequency, such that the output of each mixer (e.g., 378) will be associated with a different intermediate frequency so that the signals do not interfere with each other. This has the effect of interleaving the signals as narrow band signals across a desired bandwidth.

The downconverted signals are then passed to a multiplexer 394. The multiplexer 394, multiplexes the downconverted signals by frequency to produce a combined signal. In an exemplary embodiment, the multiplexer 394 comprises a summer that sums the signals. The combined signal is provided to an analog-to-digital converter 396 that produces a digital signal from the analog combined signal. The digital signal is provided to a digital processing assembly 398. The digital processing assembly 398 processes the digital signal to extract the information encoded in the original analog signals.

The digital processing assembly 398 can comprise digital circuitry useful for processing the combined signal. For example, the digital processing assembly can include filters or demultiplexers for distributing the combined signal and demodulators for extracting information from the component signals, and filters for attenuating noise within the processed signals. The digital processing assembly 398 can further comprise control components for controlling and correlating the multiplexing and demultiplexing of the plurality of carrier signals. In the illustrated implementation, the digital processing assembly 398 provides a control signal to the oscillators 386, 388, 390, and 392 and the multiplexer 394 to regulate the multiplexing process.

It will be appreciated that the plurality of antennas 352, 354, 356, and 358, can be spatially removed from the analog-to-digital converter 396 and the digital processing assembly 398 in accordance with an aspect of the present invention. For example, the multiplexer 394, the analog-to-digital converter 396, and the digital processing assembly 398 can be located at a central base station, while the plurality of antennas 352, 354, 356, and 358 and their associated mixers 378, 380, 382, and 384 can be distributed across respective peripheral base stations.

Figure 8:
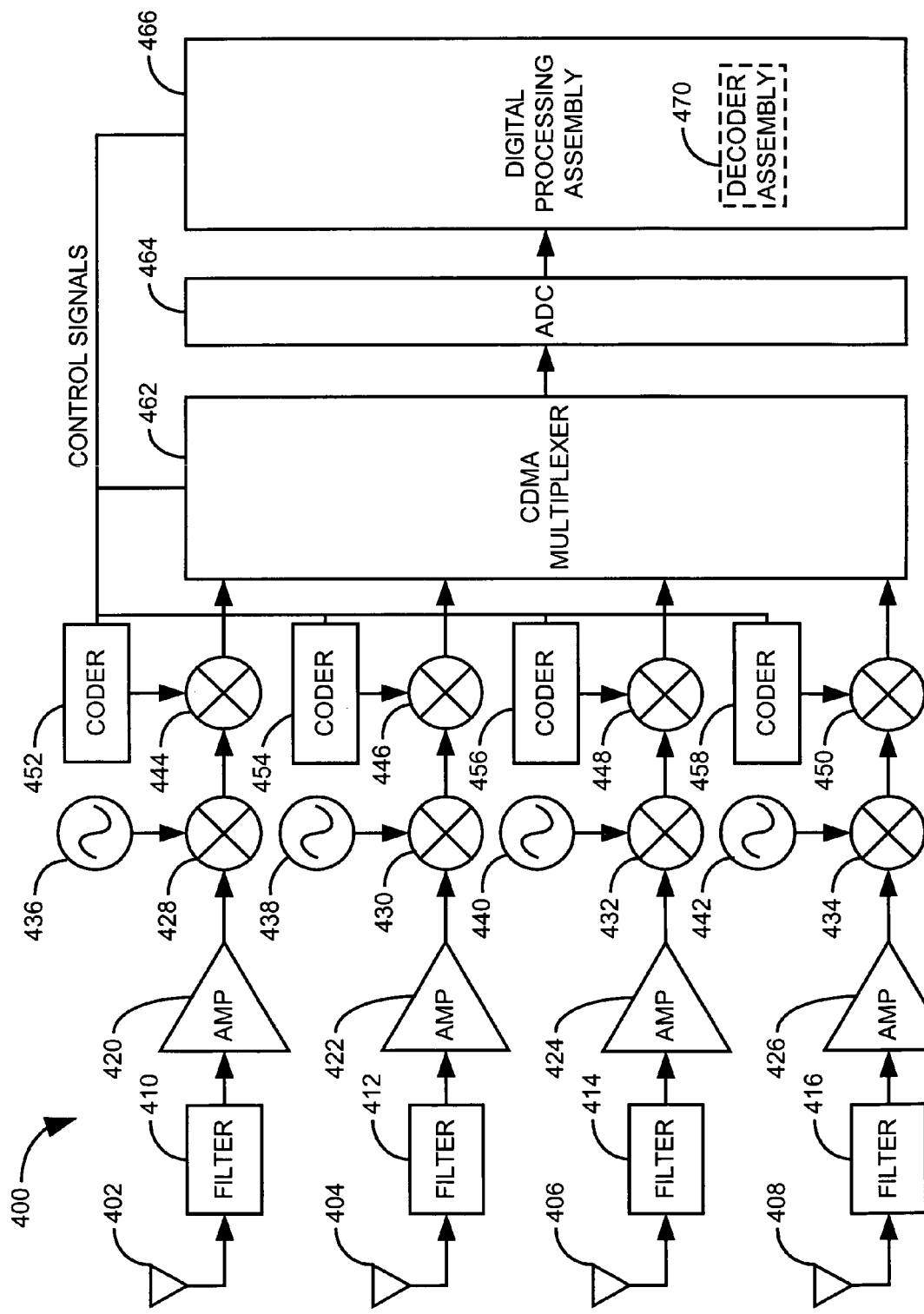
FIG. 8 illustrates a functional block diagram of a second exemplary multi-carrier receiver assembly in accordance with an aspect of the present invention.

FIG. 8 illustrates an exemplary receiver assembly 400 utilizing code division multiplexing of a plurality of carrier signals. Radio frequency analog signals are received at a plurality of antennas 402, 404, 406, and 408. While four antennas are illustrated in FIG. 8, the receiver assembly 400 can comprise either two, three, or more than four antennas in accordance with the present invention. The analog signals are filtered at respective filters 410, 412, 414, and 416. The filters can comprise appropriate analog circuitry for attenuating noise within a signal. The filtered signals are passed to respective amplifiers 420, 422, 424, and 426 that amplify the signals to an appropriate level for processing. The amplified signals are then passed to respective mixers 428, 430, 432, and 434 for downconversion to an intermediate frequency. The mixers 428, 430, 432, and 434 have associated oscillators 436, 438, 440, and 442 that produce appropriate signals for downconverting the analog signals.

The downconverted carrier signals are provided to respective mixers 444, 446, 448, and 450. The mixers 444, 446, 448, and 450 spread the carrier signals over a comparatively large bandwidth according to respective spreading codes provided at a plurality of coders 452, 454, 456, and 458. The spreading codes are mutually orthogonal, such that the bit-by-bit product of a given two codes averages to zero over time. The coded signals are provided to a code division multiple access (CDMA) multiplexer 462. The multiplexer 462 combines the coded signals to produce a combined signal. In an exemplary embodiment, the multiplexer 462 can comprise an adder that additively combines the signals. The spread signals may overlap each other in frequency as the spreading process renders the signals approximately orthogonal to each other, allowing for easy separation after digital conversion.

The combined signal is then passed to an analog-to-digital converter 464. The analog-to-digital converter 464 converts the combined signal into a digital representation of the combined signal. The digital signal is provided to a digital processing assembly 466. The digital processing assembly 466 processes the digital signal at a decoder assembly 470 to extract the information encoded in the original analog signals. The digital processing assembly 466 can comprise digital circuitry useful for processing the combined signal. For example, the digital processing assembly 466 can include decoders and demultiplexers for distributing the combined signal, demodulators for extracting information from the component signals, and filters for attenuating noise within the processed signals. The digital processing assembly 466 can further comprise control components for computing and maintaining the codes for each signal path and providing codes to the spreaders, controlling and correlating the multiplexing and demultiplexing of the plurality of carrier signals. In the illustrated implementation, the digital processing assembly 466 provides a control signal to the coders 428, 430, 432, and 434 and the multiplexer 462 to regulate the multiplexing process.

It will be appreciated that the plurality of antennas 402, 404, 406, and 408, can be spatially removed from the analog-to-digital converter 464 and the digital processing assembly 466 in accordance with an aspect of the present invention. For example, the multiplexer 462, the analog-to-digital converter 464, and the digital processing assembly 466 can be located at a central base station, while the plurality of antennas 402, 404, 406, and 408 and their associated coders 452, 454, 456, and 458 can be distributed across respective peripheral base stations.

Figure 9:
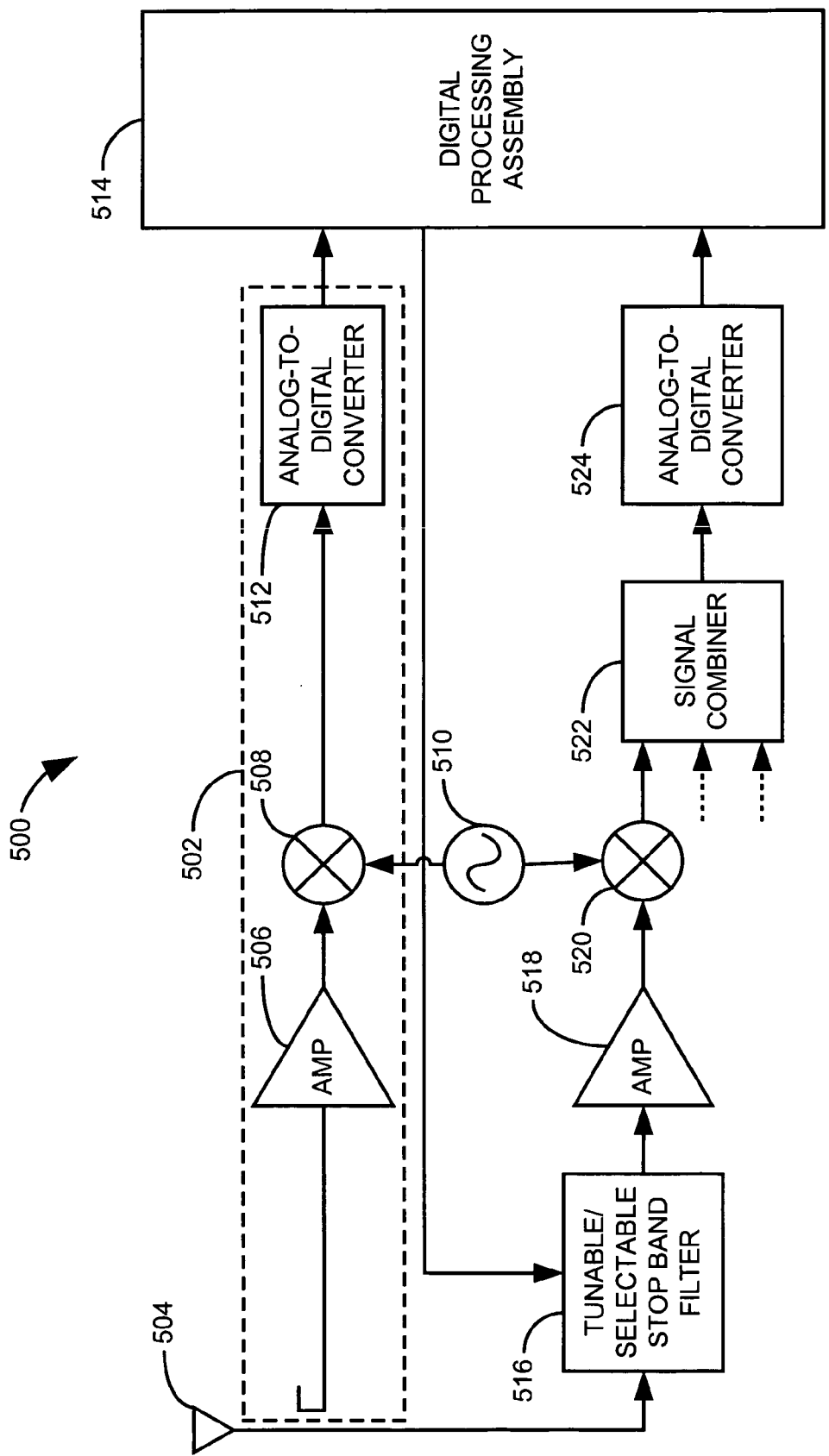
FIG. 9 illustrates an exemplary antenna path assembly that tracks and attenuates an interfering signal as part of a multi-carrier application.

FIG. 9 illustrates an exemplary antenna path assembly 500 that tracks and attenuates an interfering signal as part of a multi-carrier application. Some applications, such as multi-carrier GSM reception, require a multi-carrier receiver to operate in the presence of a strong blocking signal that interferes with the various carrier signals. For example, a receiver operating within the GSM 900 MHz band can be required to receive signals within 3 MHz of a blocking signal eighty-eight decibels above the power level of the desired signals. In the multi-carrier applications of the present invention, such noise is especially troublesome, as an interfering signal in a single antenna can negatively impact the reception of the carrier signals at other antennas.

To this end, an antenna path (e.g., 500) within a multi-carrier application can comprise a tracking assembly 502 that continuously determines the location of a strong blocking signal. The tracking assembly 502 distributes off a copy of a signal received at an antenna 504 and provides it to a first low noise amplifier 506 to amplify the signal to an appropriate level for processing. The signal is then provided to a first mixer 508, driven by an oscillator 510, where the signal is downconverted to a desired frequency. The downconverted signal is then provided to a first analog-to-digital converter 512.

The first analog-to-digital converter 512 produces a digital representation of the analog signal. In the illustrated embodiment, the first analog-to-digital converter 512 has a relatively coarse resolution to reduce the cost of the component. This coarse level of resolution is effective for the tracking application, as a precise estimate of the amplitude of the signal in each band is unnecessary to pick out a large blocking signal from a plurality of lower power noise sources. The digital signal is then processed by a digital processing assembly 514 associated with the multi-carrier receiver assembly. The digital processing assembly 514 channelizes the digital signal and determines a channel, not associated with one or more desired carrier frequencies, having a maximum magnitude. The frequency band associated with this maximum amplitude is identified as the location of the blocking signal.

The antenna path assembly 500 further comprises a tunable or selectable stop band filter 516 for attenuating the identified blocking signal. The tunable or selectable stop band filter 516 can comprise one or more filters capable of electrical selection of the center frequency of its stopband either from a plurality of discrete frequencies or along a continuous range. In an exemplary embodiment, the filter is a surface acoustic wave (SAW) filter capable of frequency adjustment through electrically actuatable micromechanical structures. An additional delay element (not shown) can be included in the main path to synchronize the two paths. The filter 516 can be electrically adjusted via a feedback signal from the digital processing assembly 514 to attenuate the frequency associated with the blocking signal, while passing one or more desired carrier signals to the receiver. Accordingly, the stopband of the filter 516 can be continuously adjusted to the frequency of the blocking signal in response to the feedback provided by the tracking assembly 502.

An analog signal is received at the antenna 504 and passed to the tunable/selectable stopband filter 516. The filter attenuates the identified blocking signal and passes the one or more desired signal to a second low noise amplifier 518. The second low noise amplifier amplifies the signal to an appropriate level for processing and provides the amplified signal to a second mixer 520. The second mixer 520 downconverts the signal according to input from the oscillator 510. The downconverted carrier signal is then passed to a signal combiner 522. The signal combiner 522 combines the downconverted carrier signal with one or more other carrier signals to form a combined signal in accordance with an aspect of the present invention. For example, the signal combiner 522 can comprise a frequency division interleaver that combines the signals.

The combined signal is provided to a second analog-to-digital converter 524 that produces a digital representation of the combined signal. In the illustrated implementation, the second analog-to-digital converter (ADC) 524 has a significantly higher resolution that the first analog-to-digital converter 512. It is to be appreciated that ADC 524 can have much lower dynamic range (e.g., coarser resolution) requirements then would be desirable if the strong interfering signal is present. It is to be further appreciated that ADC 524 can be substantially simplified in the exemplary embodiment even when only a single antenna path is received and the combiner 512 is omitted.

The digital signal is provided to the digital processing assembly 514. The digital processing assembly 514 processes the digital signal to extract information encoded in the original analog signals. In addition to the components required for analyzing the data output from the tracking assembly, the digital processing assembly 514 can comprise digital circuitry useful for processing the combined signal. For example, the digital processing assembly 516 can include decoders and demultiplexers for distributing the combined signal, demodulators for extracting information from the component signals, and filters for attenuating noise within the processed signals.

FIG. 10 illustrates an exemplary antenna path assembly 550 that tracks and selects one or more desired frequencies as part of a multi-carrier application. This allows the signals of interest received at an antenna 552 to be passed through a multiple passband filter 554 in a substantially unaltered form, while unwanted signals are attenuated. This is particularly useful in a multi-carrier receiver assembly, as it reduces the overall interference experienced by the receiver in a multiple antenna arrangement.

In the illustrated implementation, the multiband filter 554 is a tunable or selectable filter. In other words, the filter can be adjusted electrically to select a center frequency for each of a plurality of passbands either from a plurality of discrete frequencies or from a continuous range of frequency values. In an exemplary embodiment, the filter is a surface acoustic wave (SAW) filter capable of frequency adjustment through electrically actuatable micromechanical structures. The filter 554 can be electrically adjusted via a control signal from a digital processing assembly 556 to attenuate undesired carrier frequencies in the multi-carrier signal, while passing a plurality of desired carrier signals for the antenna path. The frequency properties of the desired carrier signals will be known for a particular application.

The filtered carrier signals are provided to a low noise amplifier 560. The low noise amplifier 560 amplifies the signal to an appropriate level for processing and provides the amplified signal to a mixer 562. The mixer 562 downconverts the signal according to input from an oscillator 564. The downconverted carrier signal is then passed to a signal combiner 566. The signal combiner 566 combines the downconverted carrier signal with one or more other carrier signals to form a combined signal in accordance with an aspect of the present invention. For example, the signal combiner 566 can comprise a frequency division interleaver that combines the signals. An additional delay element, not shown, can be included in the main path to synchronize the two paths.

The combined signal is provided to an analog-to-digital converter 568 that produces a digital representation of the combined signal. The digital signal is provided to the digital processing assembly 556. The digital processing assembly 556 processes the digital signal to extract the information encoded in the original analog signals. The digital processing assembly 556 can comprise digital circuitry useful for processing the combined signal. For example, the digital processing assembly 556 can include decoders and demultiplexers for distributing the combined signal, demodulators for extracting information from the component signals, and filters for attenuating noise within the processed signals. It is to be appreciated that ADC 568 can have much lower dynamic range (e.g., coarser resolution) requirements then desirable if the strong interfering signal is present. It is to be further appreciated that ADC 524 can be substantially simplified in the exemplary embodiment even when only a single antenna path is received and the combiner 566 is omitted.

FIG. 11 illustrates an exemplary antenna path assembly 600 that provides a feedforward cancellation signal for attenuating one or more interfering signals as part of a multi-carrier application. The antenna path assembly 600 comprises a cancellation assembly 602 that isolates the one or more interfering signals and generates a cancellation signal from an inversion of the isolated signals. This cancellation signal can be summed into the main signal to greatly reduce the interference caused by the interfering signals. Reducing interference is especially desirable in a multi-carrier receiver assembly, as the interference from multiple antennas can aggregate when the carrier signals are combined, leading to significant degradation of the signals.

The cancellation assembly 602 distributes off a copy of a signal received at an antenna 604 and provides it to a first low noise amplifier 606 to amplify the signal to an appropriate level for processing. The signal is then provided to a first mixer 608, driven by an oscillator 610, where the signal is downconverted to a desired frequency. The downconverted signal is provided to a first analog-to-digital converter 612. The first analog-to-digital converter 612 produces a digital representation of the analog signal. The resolution of the first analog-to-digital converter 612 can be very coarse and can vary with the desired accuracy of the cancellation signal.

The digital signal is provided to a digital channelizer 614 that separates the signals into a plurality of narrowband channels. The narrowband channels are provided to a channel selector 616 that determines the location of significant interfering signals. In the illustrated application, the channel selector 616 compares the signal strength (e.g., signal amplitude) of each channel outside of a band of desired frequencies against a predetermined threshold value. Channels exceeding this threshold are determined to contain significant interfering signals and are selected. The selected channels are provided to a phase inverter 618 that inverts the phase of the selected signals to produce a cancellation signal. The cancellation signal is then provided to a digital-to-analog converter 620 to produce an analog cancellation signal.

An analog signal is received at the antenna 604 and passed to a filter 624. The filter attenuates signals outside of one or more predetermined passbands and passes the carrier signal to a second low noise amplifier 626. The second low noise amplifier 626 amplifies the signal to an appropriate level for processing and provides the amplified signal to a second mixer 628. The second mixer 628 downconverts the signal according to input from the oscillator 610. The downconverted signal is then passed to a delay component 630, which introduces a delay of a predetermined duration into the signal to maintain synchronicity with the cancellation signal. The delayed signal is then passed to a summer 632, where the cancellation signal is applied to the delayed signal. The output is a corrected signal in which the interfering signals have been at least partially cancelled out by the inverted phase noise signal.

The corrected signal is passed to a signal combiner 634. The signal combiner 634 combines the downconverted carrier signal with one or more other carrier signals to form a combined signal in accordance with an aspect of the present invention. For example, the signal combiner 634 can comprise a frequency division interleaver that combines the signals. The combined signal is provided to a second analog-to-digital converter 636 that produces a digital representation of the combined signal. The digital signal is provided to a digital processing assembly 638. The digital processing assembly 638 process the digital signal to extract the information encoded in the original analog signals. The digital processing assembly 638 can comprise digital circuitry useful for processing the combined signal. For example, the digital processing assembly 638 can include decoders and demultiplexers for distributing the combined signal, demodulators for extracting information from the component signals, and filters for attenuating noise within the processed signals. It is to be appreciated that ADC 636 can have lower dynamic range (e.g., coarser resolution) requirements then would be needed if the strong interfering signal were present. It is to be further appreciated that ADC 524 can be substantially simplified in the exemplary embodiment even when only a single antenna path is received and the combiner 634 is omitted.

Figure 12:
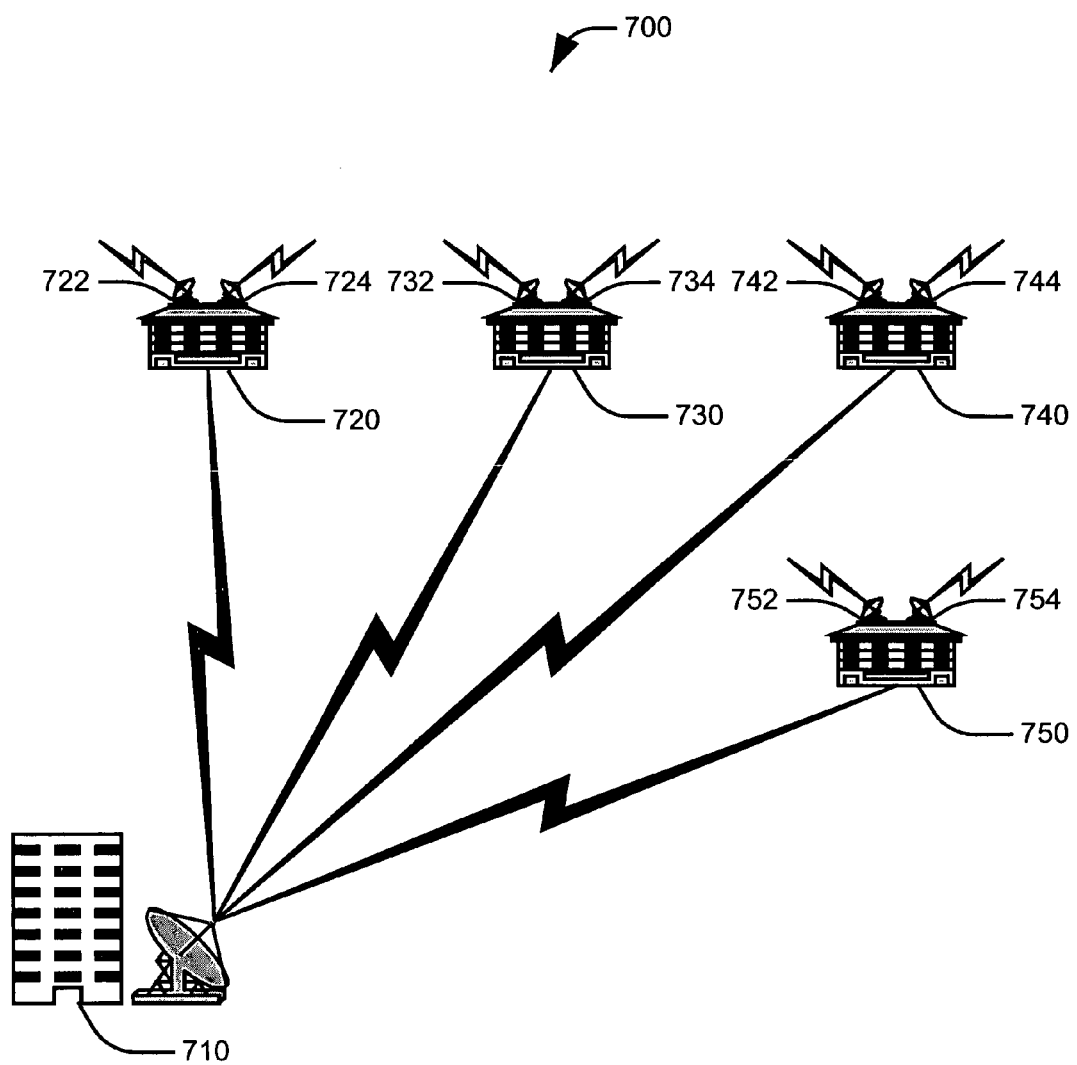
FIG. 12 illustrates an exemplary distributed transceiver arrangement 700 for a communications system in accordance with an aspect of the present invention.

FIG. 12 illustrates an exemplary distributed transceiver arrangement 700 for a communications system in accordance with an aspect of the present invention. The illustrated arrangement comprises a central base station 710, and one or more of peripheral base stations 720, 730, 740, and 750. Each base station comprises one or more antennas e.g., 722, 724, 732, 734, 742, 744, 752, and 754, which broadcast and receive carrier signals having associated frequency characteristics. It will be appreciated that any number of base stations can be utilized within the distributed system 700 as required by a specific application. It will further be appreciated that the number of peripheral stations or antennas associated with a central base station may not be constant throughout a network or even over time for a single base station.

The central base station 710 contains the digital processing circuitry for the transceiver arrangement 700. For example, the central base station 710 can include an exciter that generates a combined signal comprising a plurality of information-carrying digital carrier signals. Similarly, the digital circuitry can include digital signal processing components that receive and process a digital multi-carrier signal to extract transmitted information. The specifics of the digital circuitry can vary with the specific application of the communications system. It will be appreciated that in the illustrated transceiver arrangement 700, both transmission and reception components can be located at a single base station or peripheral station.

The central base station 710 can also comprise one or more signal conversion assemblies. For example, a digital-to-analog converter can be used to convert a multi-carrier digital signal from an exciter into an analog signal suitable for broadcasting. Conversely, an analog-to-digital converter can be used to prepare a multi-carrier analog signal received at the central base station 710 for digital processing of the signal. It will be appreciated that the signal conversion assemblies at the central base station 710 can comprise individual signal conversion components utilized in parallel by the plurality of peripheral stations (e.g., 720).

The central base station 710 can also comprise one or more signal manipulation assemblies for distributing analog multi-carrier signals and combining multiple analog carrier signals into a single signal. These signal manipulation assemblies can be distributed between the central base station 710 and the one or more peripheral base stations (e.g., 720). For example, in a transmitter arrangement using code division multiple access multiplexing, individual decoders can be used at each antenna (e.g., 722) at a peripheral base station (e.g., 720) to separate a multi-carrier signal created by a code division multiplexer at the central base station 710. Similarly, a frequency diverse multi-carrier signal in a receiver arrangement can make use of individualized downconverters for each antenna path of a peripheral base station (e.g., 720) to create frequency diverse carriers and combine them at a multiplexer at the central base station 710. It will be appreciated that the delegation of the signal manipulation components between the central base station 710 and the peripheral base stations (e.g., 720) can depend on the application and the method of signal combination.

A peripheral base station (e.g., 720) can comprise one or more antennas (e.g., 722). When an antenna (e.g., 722) is transmitting, it receives one or more analog carrier signals from a multi-carrier signal generated at the central base station 710. Carrier signals received at the antenna (e.g., 722) are transferred to the central base station 710 were they can be combined with one or more other carrier signals, received either at antennas (e.g., 724) at the same peripheral base station or at antennas (e.g., 732) located at other peripheral stations. Signals can be transferred between stations via a variety of methods. For example, the analog carrier signals can be broadcast at one or more reserved radio frequencies or transmitted through a physical medium such as a cable or fiber connection between the base stations.

Figure 13:
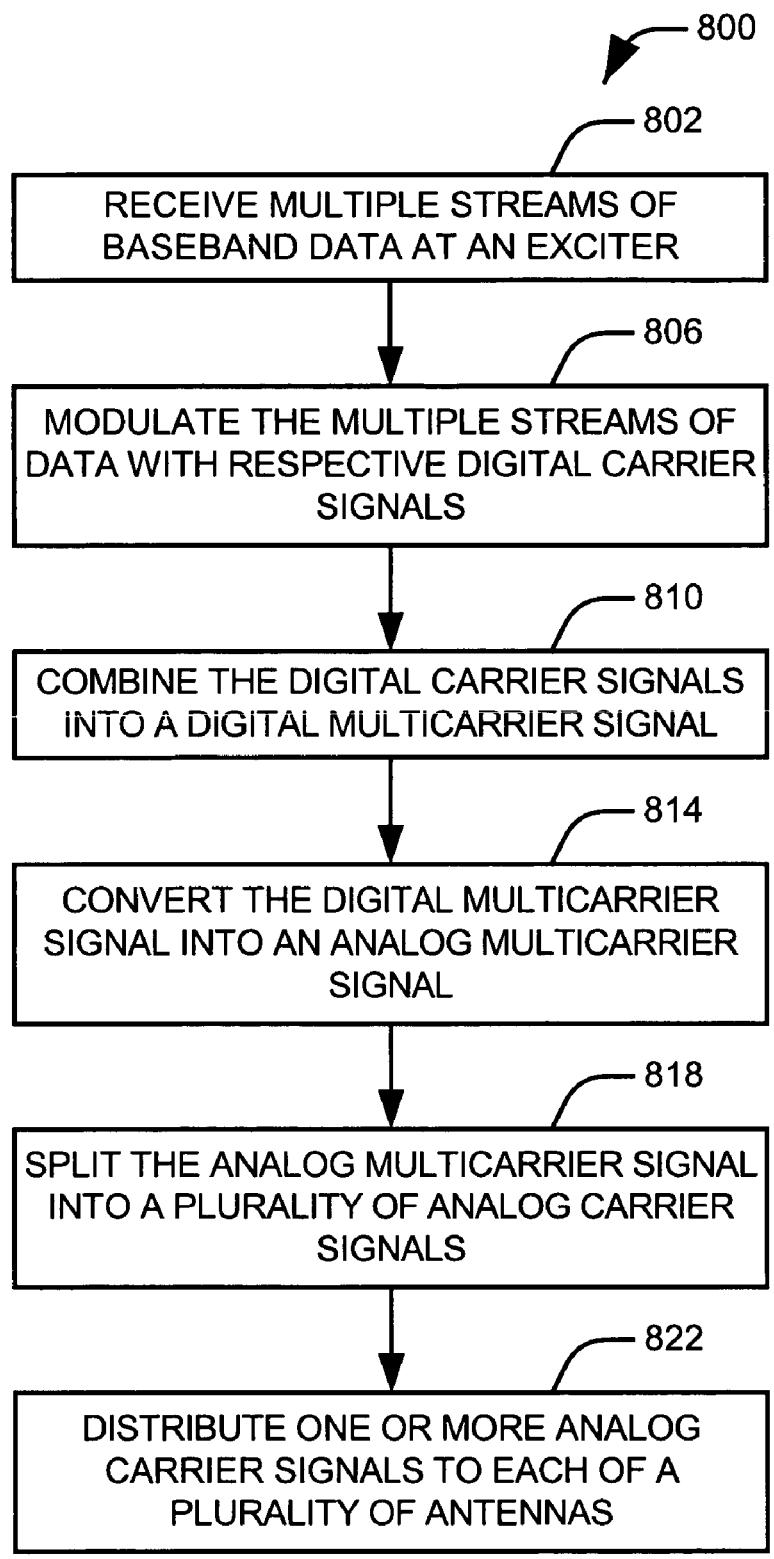
FIG. 13 illustrates a methodology for multi-carrier transmission in accordance with an aspect of the present invention.
Figure 14:
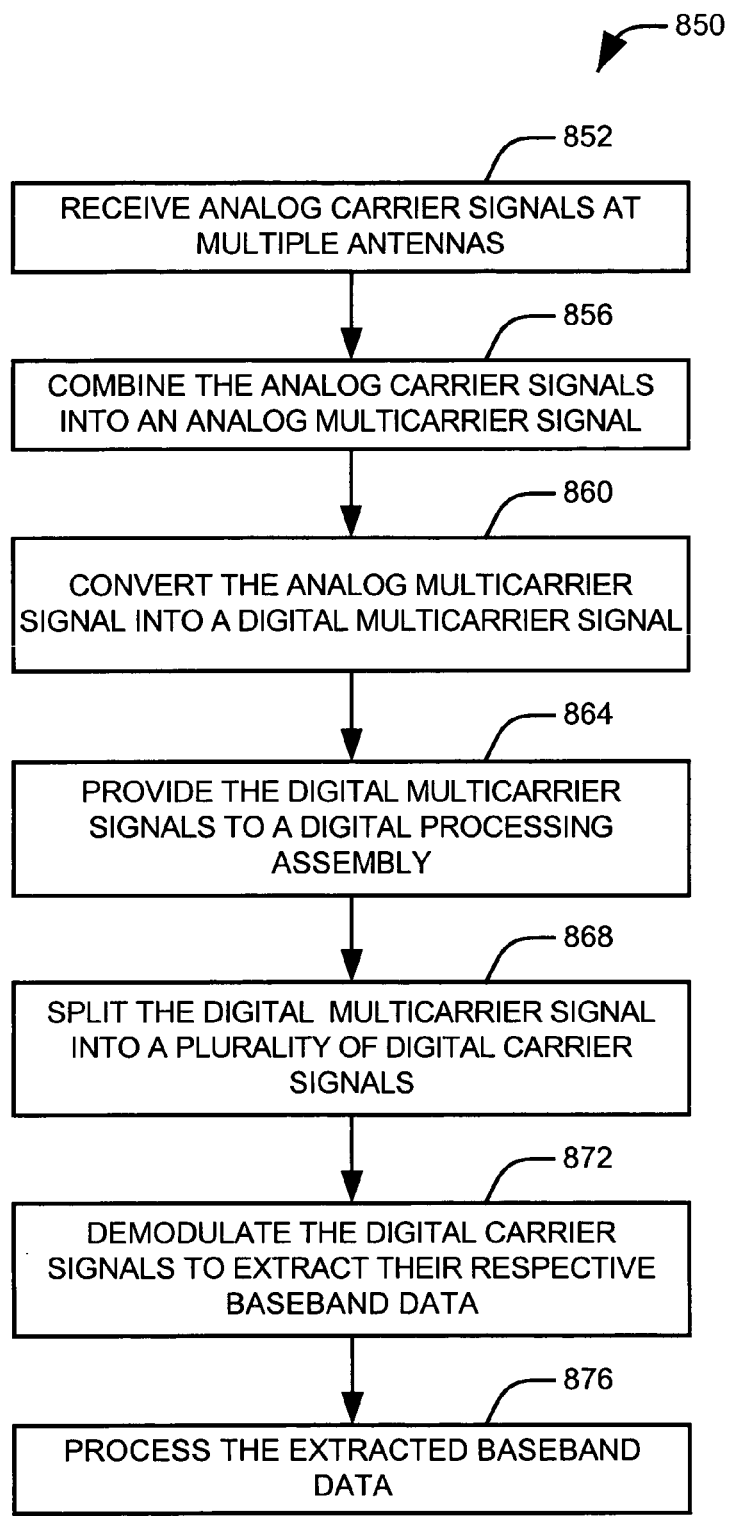
FIG. 14 illustrates a methodology for multi-carrier reception in accordance with an aspect of the present invention.

In view of the examples shown and described above, methodologies in accordance with the present invention will be better appreciated with reference to the flow diagrams of FIGS. 13 and 14. While, for purposes of simplicity of explanation, the methodologies are shown and described as executing serially, it is to be understood and appreciated that the present invention is not limited by the order shown, as some aspects may, in accordance with the present invention, occur in different orders and/or concurrently from that shown and described herein. Moreover, not all features shown or described may be needed to implement a methodology in accordance with the present invention. Additionally, such methodologies can be implemented in hardware (e.g., one or more integrated circuits), software (e.g., running on a DSP or ASIC) or a combination of hardware and software.

FIG. 13 illustrates a methodology 800 for multi-carrier transmission in accordance with an aspect of the present invention. At 802, a plurality of streams of baseband data are received at a digital exciter. These baseband datastreams can represent a variety of digital information, including recorded audio or video information and computer readable code. At 806, the baseband data streams are modulated with respective digital carrier signals. These carrier signals are combined into a multi-carrier signal at 810. The combination of the digital carrier signals can be carried out by a number of means. For example, the signals can be multiplexed by frequency, multiplexed by time division, or otherwise combined by an appropriate mechanism.

At 814, the digital multi-carrier signal is converted into an analog multi-carrier signal at a digital-to-analog converter.

The analog multi-carrier signal is distributed into a plurality of analog carrier signals at 818. The distributing of the signals can be accomplished, for example, by filtering unwanted carriers from multiple copies of the signal, despreading a coded carrier signal within a multi-carrier signal, or by demultiplexing the multi-carrier signal. The analog signals are then provided to a plurality of antennas at 822. Each antenna can be provided with one or more of the carrier signals for transmission.

FIG. 14 illustrates a methodology 850 for multi-carrier reception in accordance with an aspect of the present invention. At 852, a plurality of analog carrier signals are received at a plurality of antennas. The signals can be amplified, filtered, and downconverted along their respective antenna paths. In an exemplary embodiment, a blocking signal proximate in frequency to one or more analog carrier signals can be tracked and attenuated within the signals, in accordance with an aspect of the present invention. The received signals are combined into a multi-carrier analog signal at 856. The combination of the analog carrier signals can be carried out by a number of means. For example, the signals can be multiplexed by frequency, multiplexed by code division, or otherwise combined by an appropriate mechanism.

At 860, the analog multi-carrier signal is converted to a digital multi-carrier signal by an analog-to-digital converter. The digital multi-carrier signal is provided to a digital processing assembly at 864. At 868, the digital multi-carrier signal can be distributed into a plurality of digital carrier signals. The distributing of the signals can be accomplished, for example, by filtering unwanted carriers from multiple copies of the signal, despreading a coded carrier signal within a multi-carrier signal, or by demultiplexing the multi-carrier signal. The individual digital carrier signals are demodulated at 872 to extract baseband information from within the signal. This baseband information is processed at 876. It will be appreciated that the digital processing assembly can comprise digital components other than those required for the distributing, demodulation, and processing of the digital signals. For example, the digital processing assembly can include a signal distributor that distributes the carrier signals into multiple processing paths. In an exemplary embodiment, the digital processing assembly comprises control circuitry that provides control data to other components (e.g., a signal combiner) on the signal path.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A multi-carrier transmitter assembly, comprising:
   a digital exciter that provides a digital multi-carrier signal from baseband data, the digital multi-carrier signal comprising a plurality of time interleaved digital signals;
   a digital-to-analog converter that converts the digital multi-carrier signal into an analog multi-carrier signal;
   a signal distributor that deserializes the analog multi-carrier signal into a plurality of analog carrier signals, the signal distributor comprising a time division demultiplexer that separates the plurality of time interleaved analog signals into the plurality of analog carrier signals;
   a plurality of antennas, each of the plurality of antennas transmitting at least one of the plurality of analog carrier signals;
   wherein the signal distributor further comprises at least one passband filter having at least one passband, each of the at least one passband having an associated center frequency, the digital exciter being operative to adjust the respective center frequencies of the at least one passband.

2. The assembly of claim 1, a given passband filter from the at least one passband filter having a plurality of passbands, each of the respective center frequencies of the plurality of passbands-being electrically adjustable by the exciter.

3. The assembly of claim 1, the exciter and the digital-to-analog converter being located at a first location, and at least one of the plurality of antennas being located at a second location, spatially remote from the first location.

4. The assembly of claim 3, at least one antenna being located at a third location, spatially remote from the first location and the second location.

5. A receiver assembly, comprising:
   a plurality of antennas that each receives an analog signal comprising at least one frequency band of interest and at least one frequency band containing an interfering signal;
   a signal combiner that combines at least two of the analog signals from the plurality of antennas into a multi-carrier signal;
   a bypass configured to allow an analog signal from one of the plurality of antennas to bypass the signal combiner;
   an analog-to-digital converter that creates a digital representation of the multi-carrier signal;
   a digital processing component that receives the digital representation of the multi-carrier signal and produces a control signal from the digital representation and the analog signal from the bypass, and for each analog signal representing an associated antenna, specifying the at least one frequency band containing the interfering signal; and
   a plurality of electrically adjustable stopband filters, each electrically adjustable stopband filter being associated with one of the plurality of antennas, a given electrically adjustable stopband filter being electrically adjustable to change respective associated center frequencies of at least one stopband associated with the filter in response to the control signal associated with the associated antenna of the given adjustable filter as to attenuate the specified at least one frequency band within the analog signal received at the associated antenna of the given adjustable filter.

6. The receiver assembly of claim 5, further comprising at least one mixer for downconverting analog carrier signals, a given mixer being associated with a respective one of the at least one antennas and having an associated intermediate frequency.

7. The receiver assembly of claim 5, the signal combiner comprising a frequency multiplexer.

8. The receiver assembly of claim 5, the signal combiner comprising a code division multiple access multiplexer.

9. The receiver assembly of claim 5, further comprising a plurality of coders that provide respective spreading codes to the analog carrier signals, the respective spreading codes being mutually orthogonal.

10. The receiver assembly of claim 5, the analog-to-digital converter and the digital processing component being located at a first location, and a first of the plurality of antennas being located at a second location, spatially remote from the first location.

11. The receiver assembly of claim 10, a second of the plurality of antennas being located at a third location, spatially remote from the first location and the second location.

12. A receiver assembly, comprising:

a plurality of antennas that each receives an analog signal comprising at least one frequency band of interest and at least one frequency band containing an interfering signal;

a plurality of mixers for downconvertinq the plurality of analog signals to an intermediate frequency, wherein each mixer has an associated oscillator producing appropriate signals for downconvertinq the analog signals;

a plurality of spreaders for spreading the downconverted analog signals and produce a plurality of spreaded signals;

a code division multiplexer that combines the plurality of spreaded signals from the plurality of spreaders into an analog multicarrier signal;

an analog-to-digital converter that receives the analog multicarrier signal and creates a multicarrier digital signal comprising a representation of each analog signal in digital form;

a digital processing component that receives the digital representation of each analog signal and produces a control signal from the digital representation for each analog signal, representing an associated antenna, wherein the digital processing component further comprises control components for computing and maintaining the codes for each signal path and providing codes to the spreaders; and a plurality of passband filters, each passband filter being associated with one of the plurality of antennas.

13. The receiver assembly of claim 12, the analog-to-digital converter and the digital processing component being located at a first location, and a first of the plurality of antennas being located at a second location, spatially remote from the first location.

14. The receiver assembly of claim 13, a second of the plurality of antennas being located at a third location, spatially remote from the first location and the second location.

* * * * *